UNITED STATES PATENT OFFICE.

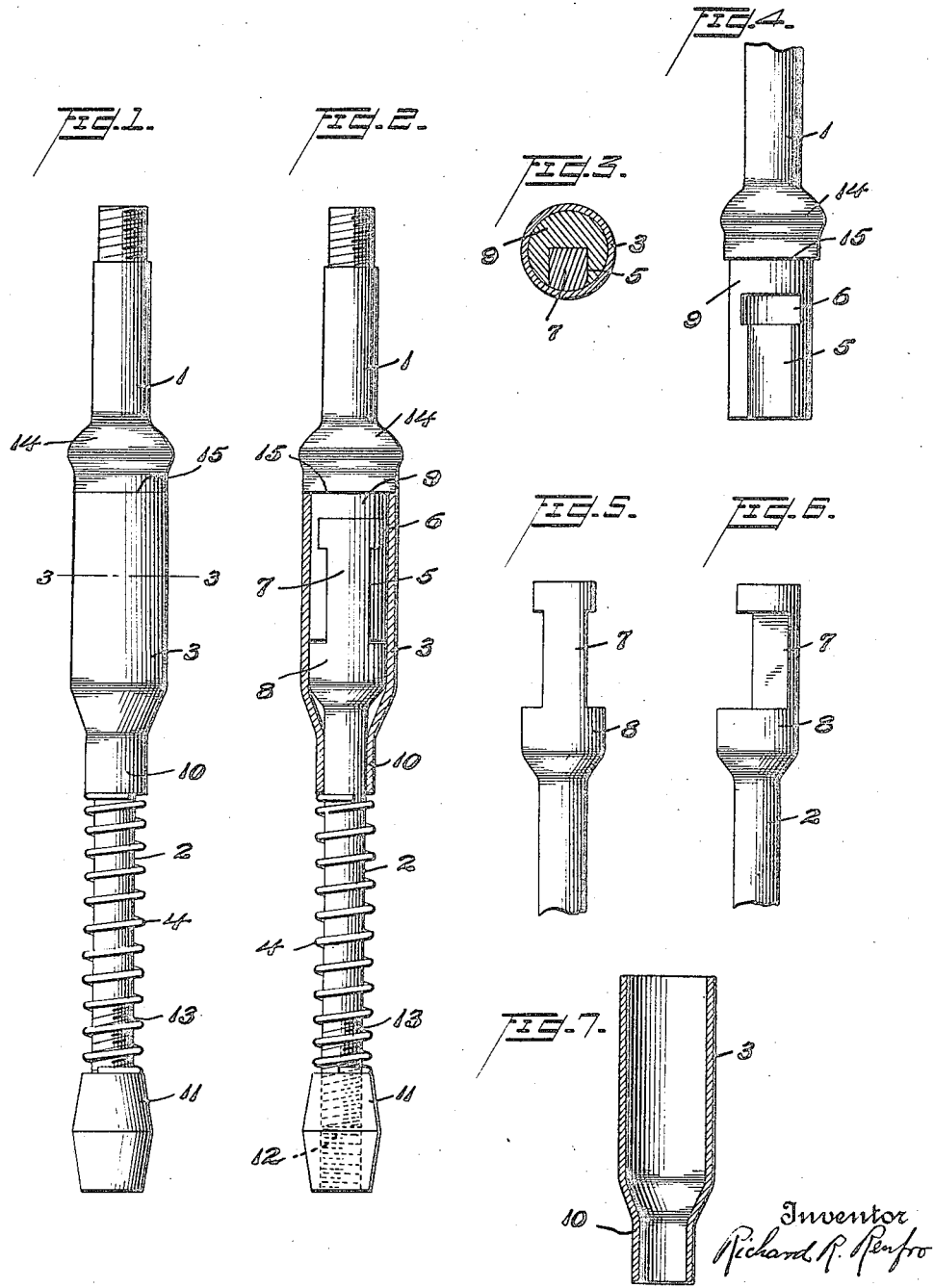

RICHARD RUDOLPH RENFRO, OF SHAMROCK, OKLAHOMA, ASSIGNOR OF TWO-THIRDS TO T. A. CLEMONS, CHARLES JACKSON, AND L. W. BURTON, ALL OF SHAMROCK, OKLAHOMA.

COUPLING FOR SUCKER-RODS OF OIL AND WATER WELLS.

1,372,905.      Specification of Letters Patent.      Patented Mar. 29, 1921.

Application filed January 23, 1920. Serial No. 353,477.

*To all whom it may concern:*

Be it known that I, RICHARD RUDOLPH RENFRO, a citizen of the United States of America, and a resident of Shamrock, Oklahoma, have invented certain new and useful Improvements in Couplings for Sucker-Rods of Oil and Water Wells, of which the following is a specification.

The invention relates to improvements in couplings for sucker rods of oil and water wells and the like.

The object of the present invention is to provide a simple, practical and efficient coupling of strong and durable construction designed for use on sucker rods of oil wells, water wells and the like and capable of being advantageously employed in joints where common cuffs and screws are used and adapted to permit two rods or sections to be readily connected and disconnected and capable of effectually preventing accidental uncoupling of the rods.

With these and other objects in view, the invention consists in the construction and novel combination and arrangement of parts hereinafter fully described, illustrated in the accompanying drawings and pointed out in the claims hereto fore appended, it being understood that various changes in the form, proportion and minor details of construction, within the scope of the appended claims, may be resorted to without departing from the spirit or sacrificing any of the advantages of the invention.

In the drawing, in which like characters of reference designate corresponding parts in the several figures:—

Figure 1 is a side elevation of a coupling constructed in accordance with this invention;

Fig. 2 is a longitudinal sectional view of the same;

Fig. 3 is a transverse sectional view on the line 3—3 of Fig. 1;

Fig. 4 is a detail view of the upper section of the coupling;

Fig. 5 is a similar view of the lower sectional coupling;

Fig. 6 is a detail view of the lower section of the coupling taken at right angles to Fig. 5; and Fig. 7 is a detail view of the slidable keeper sleeve.

In the accompanying drawings in which is illustrated the preferred embodiment of the invention, the coupling which is designed for use on the sucker rods of oil pumps, water pumps and the like, and which may be employed in any rod construction to take the place of the ordinary cuff and threaded connection, comprises in its construction, an upper rod or section 1, a lower rod or section 2, and a slidable sleeve 3 actuated by a coiled spring 4 for maintaining the upper and lower rods or sections against relative lateral movement to retain them in interlocked relation. The upper rod or section is provided with an enlarged substantially cylindrical lower portion provided at one side with a longitudinal groove or recess 5 having an enlargement 6 at the upper or inner end and adapted to receive a substantially T-shaped tongue or portion 7 of an enlarged upper end or portion 8 of the lower rod or section. The T-shaped tongue or member 7 of the lower rod or section fits in and fills the substantially T-shaped groove or recess of the enlarged portion of the upper rod or section and the rods or sections are rounded and the interfitting portions which interlock the upper and lower rods or sections are cylindrical or round in cross section as clearly illustrated in Fig. 3 of the drawing. These interlocking or engaging portions of the rods or sections are arranged contiguous to each other as clearly shown in Fig. 2 of the drawing, and are engaged and disengaged from each other by relative lateral movements of the rods or sections to carry the T-shaped tongue into and out of the substantially T-shaped groove or recess.

The sleeve which constitutes the keeper for retaining the rods or sections in their interlocked relation, is of a diameter to fit snugly the enlarged portions 8 and 9 of the upper and lower rods or sections and it has a reduced lower portion 10 which has a sliding fit on the lower rod or section and which is engaged by the coiled spring 4. The coiled spring 4 is disposed on the lower rod or section and is interposed between the lower reduced end of the tubular keeper or sleeve and a cuff 11 which is interiorly threaded at 12 and which is adjustably arranged on a threaded portion 13 of the lower rod or section. The cuff 11 forms an adjustable abutment for the lower end of the spring and is adapted to tension the same and it is also adapted to receive a tool or member when the said cuff is located at the lower end of the lower section, that is, when the lower section is relatively short. The upper and lower rods or sections may, however, be of any desired length, and when relatively long, the upper rod or section may be provided with a threaded end and the lower end of the lower rod or section may be similarly threaded to enable the said rods or sections to receive cuffs, but any other form of connection or coupling may, of course, be employed at the upper end of the upper rod or section and the lower end of the lower rod or section.

The enlarged portion 9 of the upper rod or section is provided with an annular enlargement 14 preferably oppositely tapered or rounded as shown and provided at the bottom with a shoulder 15 to form an abutment for the upper end of the tubular keeper. The annular laterally projecting enlargement 14 forms a guard and is adapted to protect and prevent the upper end of the tubular keeper from coming in contact with the wall of the hole or bore in which the sucker rod or other rod in which the joint or coupling is employed, reciprocates. This will effectually prevent the upper and lower sections from becoming accidentally uncoupled while in operation. At the same time, the structure provides a tight joint or connection and incases and protects the interlocking parts and excludes water, sand and the like from the same.

What is claimed is:—

1. A coupling of the class described including an upper rod or section having an enlarged end provided with a recess or groove, a lower rod or section provided with an enlarged end of the same diameter as the enlarged end of the upper rod or section, said enlarged end of the lower rod or section being provided with a tongue fitting in the recess or groove and provided with means for engaging the said upper rod or section to form an interlocking connection, a sleeve forming a tubular keeper and slidable on the enlarged ends of the said rods or sections, said upper rod or section being also provided with a guard of greater diameter than the upper end of the keeper and limiting the upward movement of the same and adapted to prevent the keeper from coming in contact with the wall of a well or other object and a spring engaging the said keeper for holding the latter in its engaging position.

2. A coupling of the class described including upper and lower rods or sections having enlarged contiguous ends and provided with interlocking portions movable into and out of engagement with each other by a relative lateral movement of the rods or sections, a tubular keeper slidably fitting the enlarged ends of the rods or sections and having a reduced portion slidably fitting the lower rod or section, a spring disposed on the lower rod or section and engaging the reduced end of the keeper, and an adjustable cuff mounted on the lower rod or section and forming an abutment for the spring and also adapted to operate as a coupling member.

3. A coupling of the class described including upper and lower rods or sections having enlarged contiguous ends provided with interlocking portions movable into and out of engagement with each other by a relative lateral movement of the rods or sections, said upper rod or section being also provided at its enlarged end with an annular enlargement forming a guard and having a shoulder, a tubular keeper slidable on the enlarged ends of the rods or sections and fitting against the said shoulder and protected by the said annular enlargement of greater diameter than the upper end of the sleeve, and tapered upwardly, and a spring mounted on the lower rod or section and bearing against the keeper.

4. A coupling of the class described including upper and lower rods or sections having contiguous ends provided with interlocking portions movable into and out of engagement with each other by a relative lateral movement of the rods or sections, said upper rod or section being provided with an enlarged portion forming a guard and stop, a tubular keeper slidable on the rods or sections and limited in its upward movement by the combined guard and stop and adapted to prevent separation of the rods and sections, said keeper being also provided with a reduced lower portion slidable on the lower rod or section below the interlocking parts of the said rods or sections and a spring for urging the sleeve or keeper upwardly.

In testimony whereof I have hereunto set my hand.

RICHARD RUDOLPH RENFRO.